INVENTORS
LUTHER M. FOSTER
JOHN E. SCARDEFIELD

BY Thomas J. Kilgannon Jr.
ATTORNEY

Feb. 11, 1969 L. M. FOSTER ET AL 3,427,211

PROCESS OF MAKING GALLIUM PHOSPHIDE DENDRITIC CRYSTALS WITH GROWN IN P-N LIGHT EMITTING JUNCTIONS

Filed July 28, 1965

United States Patent Office 3,427,211
Patented Feb. 11, 1969

3,427,211

PROCESS OF MAKING GALLIUM PHOSPHIDE DENDRITIC CRYSTALS WITH GROWN IN p-n LIGHT EMITTING JUNCTIONS

Luther M. Foster, Chappaqua, and John E. Scardefield, New Hamburg, N.Y., assignors to International Business Machines Corporation, Armonk, N.Y., a corporation of New York Filed July 28, 1965, Ser. No. 475,541
U.S. Cl. 148—171 14 Claims
Int. Cl. H01l 7/32

This invention relates generally to a method for producing gallium phosphide diodes and more specifically to a method of growing dendritic gallium phosphide crystals from a double doped gallium solution to provide diodes with grown in junctions which display electroluminescent emission at energies near the band gap and having higher efficiencies than prior art diodes.

Electroluminescence which is the direct conversion of electrical energy to light energy has been known in semiconductors for many years. It is only recently, however, that any intensive effort has been made to take advantage of this phenomenon. The electroluminescent diode is attractive because it can be made extremely small, is rugged and reliable and is compatible in electrical energy inputs with other solid state devices such as transistors.

Past efforts to provide electroluminescence have indicated that it is possible to obtain emissions in both the infrared and visible spectrums. Most of the work done in this area has dealt with the production of diodes which emit radiation at 7000 A., a wave length near the edge of the visible spectrum. Other researchers have indicated that it is possible to obtain emission at about 5680 A. using a technique described in a paper by J. Stankiewicz and J. W. Allen, Journal of Physics and Chemistry of Solids, vol. 23, page 881, 1962. Emission at that wave length can be considerably less in intensity compared to the intensity of radiation at 7000 A. and still be detected with greater ease by the human eye because of the response characteristic of the human eye. The efficiencies obtainable at 5680 A., however, have not been satisfactory and a recent article in British Communications and Electronics by M. C. Rowland and R. C. Bottomly entitled "Gallium Phosphide Crystal Lamps," February 1965, pages 90–92, indicates that the production of diodes emitting in the 7000 A. range is somewhat easier and under better control. A great deal of effort is presently being undertaken to provide a method for producing gallium phosphide diodes which emit in the green (5680 A.) with higher efficiencies than have been obtainable heretofore. Stankiewicz and Allen, in their paper referred to hereinabove, have indicated that green luminescence is produced upon the addition of zinc to a gallium rich gallium-gallium phosphide solution. Further, they have indicated that green luminescence is obtainable by doping the solution with zinc alone and that somewhat better results have been obtained when the solution is doped with zinc and a small amount of oxygen. In spite of these prior art teachings, no gallium phosphide diode which emits in the green has been produced having satisfactory efficiencies. It appears, therefore, that a method for producing diodes which emit in the green at relatively high efficiencies would be most desirable and useful.

It is, therefore, an object of this invention to provide a method of manufacturing gallium phosphide electroluminescent diodes which are superior to prior art devices.

Another object is to provide a method of manufacturing gallium phosphide electroluminescent diodes by which the emitting junction is "grown in."

Another object is to provide a method for producing gallium phosphide diodes which emit in the green (in the region of 5680 A.) with high efficiencies.

Another object is to provide a method for producing gallium phosphide diodes which can be closely controlled.

A further object is to provide a method for producing gallium phosphide diodes which are amenable to mass production.

Another object is to provide a method for producing gallium phosphide diodes which are useful as solid state indicators.

Another object is to provide a diode having a built-in p-n junction which emits in the green with high efficiency.

Still another object is to provide a method for producing gallium phosphide diodes which provide emission in the green by virtue of a transition between shallow acceptor dopants and shallow donor dopants within the gallium phosphide material.

A feature of this invention is the utilization of a method for producing gallium phosphide diodes having emissions in the region of 5680 A. which includes the steps of introducing gallium and gallium phosphide into a non-contaminating vessel in a ratio sufficient to form a dilute solution when heated. The vessel is then heated to a temperature sufficient to remove all gases, especially oxygen, and donor and acceptor dopants are introduced into the vessel. The contents of the vessel are then heated in the absence of oxygen at a temperature for a time sufficient to dissolve the gallium phosphide. When the gallium phosphide is dissolved, the vessel is cooled at a rate sufficient to cause dendritic crystal growth during which said dopants segregate to form grown-in, p-n light emitting junctions.

Another feature is the utilization of a method for producing gallium phosphide diodes having emission in the region of 5680 A. which includes the steps of simultaneously introducing a donor dopant selected from the group consisting of sulphur, selenium and tellurium and an acceptor dopant selected from the group consisting of cadmium and zinc into a vessel containing gallium and gallium phosphide and heating the vessel to dissolve the contents thereby forming doubly doped dilute solutions of gallium phosphide and gallium. The contents are then cooled at a rate sufficient to cause impurity segregation and results in the formation of built-in p-n junctions.

Another feature of this invention is the step of applying contacts to opposing faces of diced crystals by alloying or the like. The application of the contacts is unique in that one of the p-n junctions which has light emitting capability is destroyed by alloying through that p-n junction and bonding the contact to the underlying p-type layer. The opposing face has contacts applied in the usual manner by simply alloying an ohmic contact to the n-type material.

Another feature of this invention is the utilization of a gallium phosphide diode adapted to emit in the green which consists of a body of gallium phosphide semiconductor material having a first region within the body containing a segregated shallow donor impurity. The body also has a second region within it which contains a segregated shallow acceptor impurity. The first and second regions form a p-n junction at their interface from which light is emitted near the band gap of gallium phosphide.

Still another feature is the utilization of a gallium phosphide semiconductor device adapted to emit light in the region of 5680 A. which consists of a body of gallium phosphide semiconductor material and regions within the body containing a segregated shallow donor impurity selected from the group consisting of sulphur, selenium and tellurium. Also included is a region within the body separating the first mentioned regions containing a segregated shallow acceptor impurity selected from the group consisting of cadmium and zinc. These regions form p-n junctions at their interfaces which have a light emitting capability in the region of 5680 A.

The foregoing and other objects features and advantages of the invention will become apparent from the following more particular description of a preferred embodiment of the invention as illustrated in the accompanying drawings.

Figure 3A:
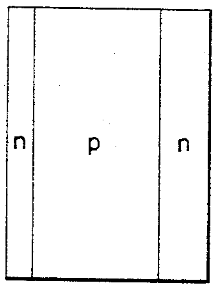

FIG. 3*a* is a cross-sectional view of a dendritic crystal showing n-type regions near the surface of the crystal with a broad p-type region in between.

Figure 3B:
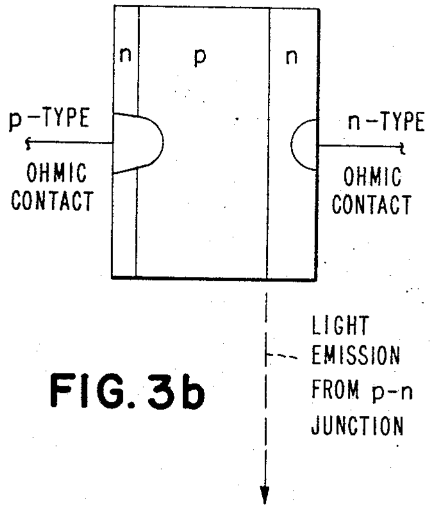

FIG. 3*b* is a cross-sectional view of a diode provided by the method of this invention which emits in the region of 5680 A.

Gallium phosphide diodes which provide emission from a p-n junction when biased in the forward direction depend upon the injection of excess carriers across the junction which recombine in the energy gap. Light is emitted when the transition is radiative, that is, energy is given up in the form of light when, for instance, a carrier decays from the conduction band to an impurity level near the valence band or when a transition occurs from an impurity level near the conduction band to an impurity level near the valence band. The latter transition is the most widely used; and impurity level near the conduction band being provided by doping with a donor dopant (oxygen is the only reported donor dopant) and an impurity level near the valence band being provided with an acceptor dopant (zinc has been reported as an acceptor dopant for use along with oxygen as a dopant) to provide a light output in the region of 7000 A. Zinc doping of gallium phosphide with no other known impurity used has also been utilized indicating a radiative transition from the conduction band to an impurity level near the valence band providing emission at 5680 A. While the method of the present invention falls broadly into the category of a light emitting transition between two impurity levels, one near the conduction band and one near the valence band, it differs from such prior art transitions in that a new family of shallow donors unrelated to oxygen is utilized to obtain a light emitting transition, not at 7000 A. as obtained by double doping as taught by the prior art, but at 5680 A.; that portion of the visible spectrum to which the human eye has optimum response. Furthermore, in the present method oxygen is rigorously excluded and emissions at 5680 A. of higher efficiencies than heretofore attained are obtained utilizing donor dopants such as sulphur, selenium and tellurium. This enhancement of emission efficiency over the diodes of the prior art which are made using zinc alone as an impurity indicates that the impurities used in the present method contribute materially to such enhancement.

Figure 1:
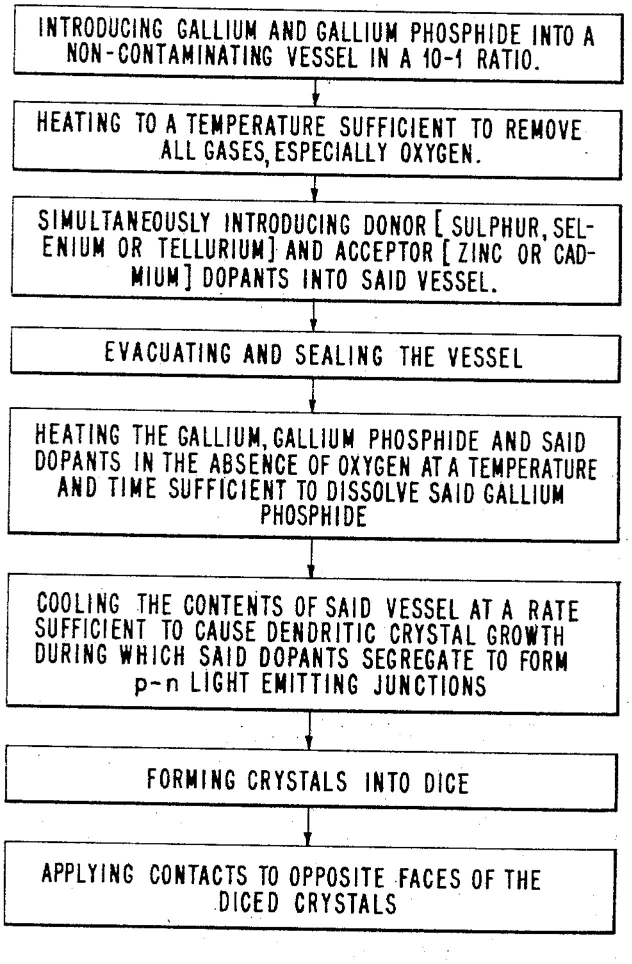
FIG. 1 is a block diagram indicating the various steps required in the method of producing the electro-luminescent diode of the present invention.

FIG. 1 shows a block diagram of the various steps utilized in the practice of the present invention. Referring now to FIG. 1 along with FIG. 2 which shows the apparatus utilized in the practice of this invention the following preferred method of producing gallium phosphide is used.

Figure 2:
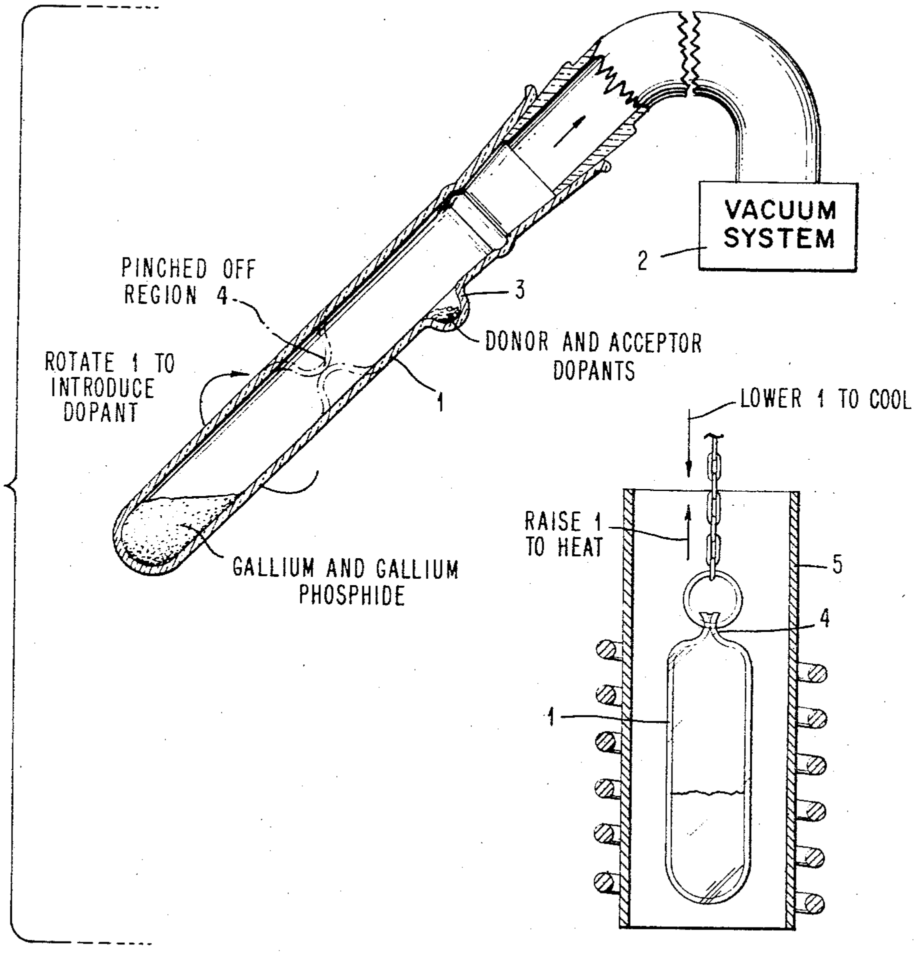
FIG. 2 is a cross-sectional view of the apparatus utilized in performing the method of the present invention.

The initial step is to introduce a quantity of high purity gallium into a tube 1 of non-contaminating material such as quartz along with pellets of gallium phosphide in amounts such that a dilute solution of gallium and gallium phosphide is produced upon heating. The preferred ratio is 10 grams of gallium to 1 gram of gallium phosphide. This ratio is not critical and may be departed from slightly without adversely affecting the resulting diodes. A vacuum system 2 is shown in FIG. 2 connected to the open end of tube 1 and is utilized to remove the gases driven out of the materials in the tube in the following step. The gallium and gallium phosphide are then heated to redness by a torch or other suitable heater to outgas these materials of any impurities which might adversely affect the resulting diodes. Outgassing is undertaken principally to rigorously remove all oxygen from the gallium and gallium phosphide. It should be recalled here that oxygen was a principal constituent in prior art methods where red emission was desired. When outgassing is completed, tube 1 is cooled and the desired dopants in appropriate amounts are dropped to the bottom of tube 1 by rotating the tube. Prior to outgassing, the donor and acceptor dopants had been placed in depression 3 of tube 1 so that the vacuum could be maintained during outgassing. Vaporization of the dopants is also avoided.

The dopants utilized are selected from both the acceptor and donor classes of dopants and are introduced simultaneously into the bottom of tube 1 prior to generating a dilute solution of gallium and gallium phosphide by heating in a furnace. Specifically, donor dopants selected from the group consisting of sulphur, selenium and tellurium are utilized. Zinc and cadmium are suitable acceptor dopants. Thus, one dopant from each class is provided; one of which may be characterized as a shallow donor because of its position near the conduction band and the other of which may be characterized as a shallow acceptor because of its position near the valence band. It appears that an energy difference of 2.18 ev. is provided by the shallow donors and acceptors and this is substantiated by the fact that emission at 5680 A. is obtained.

When a ratio of 1 gram of gallium phosphide to 10 grams of gallium is utilized the dopants should be added in the following amounts:

| | Weight, mg. |
|---|---|
| Donor dopants: | |
| Sulphur | 0.1–0.5 |
| Selenium | 0.245–1.23 |
| Tellurium | 0.395–1.99 |
| Acceptor dopants: | |
| Zinc | 10–20 |
| Cadmium | 17.2–34.4 |

It should be noted that selenium and tellurium are introduced in the same molar proportions as sulphur. Also, any combination of a single acceptor dopant and a single donor dopant may be utilized and emission at 5680 A. will be obtained.

Once the dopants are introduced, tube 1 is sealed off from the vacuum system by pinching off tube 1 in region 4 shown by dotted lines in FIG. 2. Heating is then undertaken in furnace 5 to dissolve the gallium phosphide and dopants in the gallium. For the raio of 10:1 mentioned above, tube 1 is heated for approximately two hours at a temperature of 1120° C. After two hours, tube 1 is slowly withdrawn from furnace 5 through a temperature gradient and cooled to room temperature. Cooling times of ½–2 hours are suitable. During cooling impurity segregation takes place. The unique features of dendritic growth mechanism results in the segregation of dopants to provide a built-in or grown-in p-n light emitting junction.

After cooling, the precipitated gallium phosphide crystals are recovered from the excess gallium by dissolving the gallium in hot dilute hydrochloric acid.

When the crystals are grown as described above with the dopants segregating during growth, the donor dopants concentrate principally toward the outside of the dendritic plates and acceptor dopants concentrate principally at the center. FIG. 3*a* shows a cross-sectional view of a gallium phosphide crystal with a region, a zinc doped region, for instance, in the center and regions of sulphur doped gallium phosphide concentrated near the edges of the crystal. From this, it is seen that built-in or grown-in p-n junctions are provided directly by means of dendritic crystal growth. The built-in junctions are an important feature of the resulting diode which is quite distinct from the prior art techniques which provide substantailly p-type gallium phosphide crystals without a p-n junction.

The p-n junction is provided in the prior art by alloying-in tin or some other n-type material to provide an alloyed p-n junction from which light is emitted. In FIG. 3*a*, the built-in p-n junctions result from segregation of dopants during growth and the crystal undoubtedly contains a rather broad compensated zone, since the dopant segregation is not likely to be abrupt. It should be noted in FIG. 3*a*, that a crystal is provided from which it is possible to obtain light emission at two p-n junctions and that one of the n-type zones is of greater thickness than the other. This variation in thickness is due to the preferential manner of growth during manufacture. Since only one junction at a time can emit because of polarity considerations, the presence of the thin n-type layer suggested a unique solution to the problem of providing appropriate contacts to the diode which is simple, rugged and inexpensive.

Referring now to FIG. 3*b*, a gallium phosphide diode having an n-p-n configuration is shown. Since only one junction can be utilized for emission, an ohmic contact of p-type material, preferably an alloy of gold and zinc, is alloyed to the thinner of the n-type regions in such a way that it alloys-through or punches-through the n-layer and makes contact with the p-type zone which is already doped with zinc. Another contact of n-type material, preferably an alloy of tin and gold, is applied to the thicker of the n-type zones forming an ohmic contact with that n-type zone. Alternatively, the thinner of the n-type layers could be removed by lapping or etching and the same contacts applied directly to the remaining p and n regions. It is clear, however, that the step of alloying through the thinner of the n-type regions eliminates the steps of etching and lapping, and constitutes the preferred method of applying contacts to the diodes.

From the foregoing, it is seen that a method has been provided which provides electroluminescent p-n junctions directly from the crystal growing operation which emit at 5680 A. with high efficiency. The resulting diode while constituting a diode in the broad sense, is distinguishable from other similar diodes in that the p-n junction is built-in or grown-in and need not be provided by alloying to a p-type region with an n-type material. It is significant that the resulting emission from the diode of the present invention contains little or no red component. Also, it is significant that the external quantum efficiency in the 5680 A. band has been measured at $1.5\times10^{-4}$ without special effort to maximize geometry, reduce internal reflection and the like. If geometry and reflection effects were minimized, a substantial increase in external emission can be expected.

While the invention has been particularly shown and described with reference to a preferred embodiment thereof, it will be understood by those skilled in the art that various changes in form and details may be made therein without departing from the spirit and scope of the invention.

What is claimed is:

1. A method for producing gallium phosphide diodes having emission in the region of 5680 A. comprising the steps of:
- introducing gallium and gallium phosphide into non-contaminating vessels in a ratio sufficient to form a dilute solution when heated,
- heating said gallium and gallium phosphide at a temperature sufficient to remove all gases,
- simultaneously introducing donor and acceptor dopants into said vessel,
- sealing off said vessel,
- heating said gallium, gallium phosphide and said dopants in the absence of oxygen at a temperature and for a time sufficient to dissolve said gallium phosphide, and
- cooling said solution at a rate sufficient to cause dendritic crystal growth during which said dopants segregate to form p-n light emitting junctions.

2. A method for producing gallium phosphide diodes having emission in the region of 5680 A. comprising the steps of:
- introducing gallium and gallium phosphide into non-contaminating vessels in a ratio sufficient to form a dilute solution when heated,
- heating said gallium and gallium phosphide at a temperature sufficient to remove all gases,
- simultaneously introducing shallow donor and shallow acceptor dopants into said vessel,
- sealing off said vessel,
- heating said gallium, gallium phosphide and said dopants in the absence of oxygen at a temperature and for a time sufficient to dissolve said gallium phosphide, and
- cooling said solution at a rate sufficient to cause dendritic crystal growth during which said dopants segregate to form p-n light emitting junctions.

3. A method for producing gallium phosphide diodes having emission in the region of 5680 A. comprising the steps of:
- introducing gallium and gallium phosphide into non-contaminating vessels in a ratio sufficient to form a dilute solution when heated,
- heating said gallium and gallium phosphide at a temperature sufficient to remove all gases,
- simultaneously introducing a donor dopant selected from the group consisting of sulphur, selenium and tellurium and an acceptor dopant selected from the group consisting of cadmium and zinc into said vessel,
- sealing off said vessel,
- heating said gallium, gallium phosphide and said dopants in the absence of oxygen at a temperature and for a time sufficient to dissolve said gallium phosphide, and
- cooling said solution at a rate sufficient to cause dendritic crystal growth during which said dopants segregate to form p-n light emitting junctions.

4. A method for producing gallium phosphide diodes having emission in the region of 5680 A. comprising the steps of:
- introducing gallium and gallium phosphide into a quartz vessel in a 10:1 ratio to form a dilute solution when heated,
- heating said gallium and gallium phosphide at a temperature sufficient to remove all gases,
- simultaneously introducing a donor dopant selected from the group consisting of sulphur, selenium and tellurium and an acceptor dopant selected from the group consisting of cadmium and zinc into said vessel,
- sealing off said vessel,
- heating said gallium and gallium phosphide and said dopants in the absence of oxygen at a temperature of 1120° C. for approximately two hours to dissolve said gallium phosphide,
- cooling said solution from said first mentioned temperature to room temperature in a time range of 0.5 to 2 hours to cause dendritic crystal growth during which said dopants segregate to form p-n light emitting junctions.

5. A method for producing gallium phosphide diodes having emission in the region of 5680 A. comprising the steps of:
- introducing 10 grams of gallium and 1 gram of gallium phosphide into a quartz vessel to form a dilute solution when heated,
- heating said gallium and gallium phosphide at a temperature sufficient to remove all gases,
- simultaneously introducing a donor dopant selected from the group consisting of sulphur, selenium, tellurium and having a range of weights of 0.1–0.5 mg., 0.245–1.23 mg., 0.395–1.99 mg., respectively, and an acceptor dopant selected from the group consisting of cadmium and zinc having a range of weights of 17.2–34.4 mg., 10–20 mg., respectively, into said vessel, sealing off said vessel, heating said gallium and said gallium phosphide and said dopants in the absence of oxygen at a temperature of 1120° C. for approximately two hours to dissolve said gallium phosphide, cooling said solution from said first mentioned temperature to room temperature in a time range of 0.5 to 2 hours to cause dendritic crystal growth during which said dopants segregate to form p-n light emitting junctions.

6. A method according to claim 5 further including the step of:

dissolving the excess gallium after cooling in hot dilute hydrochloric acid to recover the precipitated gallium phosphide crystals.

7. A method according to claim 5 further including the steps of forming said crystal into dice and applying contacts to opposite faces thereof.

8. A method according to claim 7 wherein the step of applying contacts to opposite faces of said crystal includes the step of alloying through one of said light emitting junctions to contact an n-region and alloying a contact to an opposing p-region.

9. A method according to claim 7 wherein the step of applying contacts to opposite faces of said crystal includes the steps of removing one of said light emitting junctions and applying ohmic contacts to the opposite sides of a remaining p-n junction.

10. In the method for producing light emitting p-n junctions in the dendritic growth of p-n junctions from a gallium rich solution of gallium and gallium phosphide in a non-contaminating vessel the steps of:

introducing simultaneously donor and acceptor dopants into said vessel, reacting said gallium, said gallium phosphide and said dopants in the absence of oxygen at a temperature and for a time sufficient to dissolve said gallium phosphide and, cooling said reacted gallium, gallium phosphide and said dopants at a rate sufficient to cause dendritic growth during which said dopants segregate to form p-n light emitting junctions.

11. In the method for producing light emitting p-n junctions in the dendritic growth of p-n junctions from a gallium rich solution of gallium and gallium phosphide in a non-contaminating vessel the steps of:

introducing simultaneously a donor dopant selected from the group consisting of sulphur, selenium and tellurium and an acceptor dopant selected from the group consisting of zinc and cadmium into said vessel, reacting said gallium, said gallium phosphide and said dopants in the absence of oxygen at a temperature and for a time sufficient to dissolve said gallium phosphide, and cooling said reacted gallium, gallium phosphide and said dopants at a rate sufficient to cause dendritic growth during which said dopants segregate to form p-n light emitting junctions.

12. In the method for producing light emitting p-n junctions in the dendritic growth of p-n junctions from a gallium rich solution of gallium and gallium phosphide in a non-contaminating vessel the steps of:

introducing simultaneously a donor dopant selected from the group consisting of sulphur, selenium and tellurium and an acceptor dopant selected from the group consisting of zinc and cadmium into said vessel, reacting said gallium, said gallium phosphide and said dopants in the absence of oxygen at a temperature of 1120° C. for approximately two hours to dissolve said gallium phosphide, and cooling said reacted gallium, gallium phosphide and said dopants from 1120° C. to room temperature in a time range of 0.5 to two hours to cause dendritic crystal growth during which said dopants segregate to form p-n light emitting junctions.

13. In the method for producing light emitting p-n junctions in the dendritic growth of p-n junctions from a gallium rich solution of gallium and gallium phosphide in a non-contaminating vessel the steps of:

introducing simultaneously a donor dopant selected from the group consisting of sulphur, selenium and tellurium and having a range of weights of 0.1–0.5 mg., 0.245–1.23 mg., 0.395–1.99 mg., respectively and an acceptor dopant selected from the group consisting of cadmium and zinc and having a range of weights of 17.2–34.4 mg., 10–20 mg., respectively, into said vessel, reacting said gallium, said gallium phosphide and said dopants in the absence of oxygen at a temperature of 1120° C. for approximately two hours to dissolve said gallium phosphide, and cooling said reacted gallium, gallium phosphide and said dopants from 1120° C. to room temperature in a time range of 0.5 to two hours to cause dendritic crystal growth during which said dopants segregate to form p-n light emitting junctions.

14. A method according to claim 10 further including the steps of:

dissolving the excess of gallium after cooling in hot dilute hydrochloric acid to recover the precipitated gallium phosphide crystals.

References Cited

UNITED STATES PATENTS

| | | | |
|---|---|---|---|
| 3,031,403 | 4/1962 | Bennett | 252—62.3 |
| 3,129,061 | 4/1964 | Dermatis et al. | 148—1.6 XR |
| 3,130,040 | 4/1964 | Faust et al. | 148—1.6 XR |
| 3,192,082 | 6/1965 | Tomono et al. | 148—171 XR |
| 3,245,002 | 4/1966 | Hall | 317—234 XR |
| 3,305,313 | 2/1967 | Sirgo et al. | 23—204 |
| 3,306,703 | 2/1967 | Dersin et al. | 23—204 |

OTHER REFERENCES

Benett et al.: Physical Review, vol. 116, pp. 53–61, October 1951.

Longini et al.: Journal of Applied Physics, vol. 13, pp. 1204–1207, July 1960.

Metallurgy of Elemental & Compound Semiconductors, vol. 12, AIME Publ., Interscience Publishers, N.Y. (1961), pp. 97–200, especially 149–186.

L. DEWAYNE RUTLEDGE, *Primary Examiner.*

P. WEINSTEIN, *Assistant Examiner.*

U.S. Cl. X.R.

23—204, 273, 300; 148—1.5, 1.6, 171; 252—62.3